(12) United States Patent
Liang et al.

(10) Patent No.: US 12,099,544 B2
(45) Date of Patent: Sep. 24, 2024

(54) SYSTEMS AND METHODS FOR GENERATING STORIES FOR LIVE EVENTS USING A SCALABLE PIPELINE

(71) Applicant: Google LLC, Mountain View, CA (US)

(72) Inventors: Benedict Junjie Liang, Singapore (SG); Ahmad Nizam Anuar, Johor (MY); Sumeet Kale, Singapore (SG); Ching-Fei Yang, Singapore (SG); Dian Zhang, Beijing (CN); Kiat Chuan Tan, Singapore (SG)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/870,382

(22) Filed: Jul. 21, 2022

(65) Prior Publication Data
US 2024/0028634 A1    Jan. 25, 2024

(51) Int. Cl.
 *G06F 16/00* (2019.01)
 *G06F 16/435* (2019.01)
 *G06F 16/48* (2019.01)
 *H04N 21/2187* (2011.01)

(52) U.S. Cl.
 CPC ............ *G06F 16/435* (2019.01); *G06F 16/48* (2019.01); *H04N 21/2187* (2013.01)

(58) Field of Classification Search
 CPC .... G06F 16/435; G06F 16/48; H04N 21/2187
 See application file for complete search history.

(56) References Cited

U.S. PATENT DOCUMENTS

| | | | | |
|---|---|---|---|---|
| 2015/0242374 A1* | 8/2015 | Kong | ............... | G06F 40/106 715/201 |
| 2015/0363503 A1* | 12/2015 | Scheuerman | ......... | G06F 40/103 715/202 |
| 2022/0215606 A1* | 7/2022 | Radford | ............... | G06F 40/103 |

* cited by examiner

*Primary Examiner* — Paul Kim
(74) *Attorney, Agent, or Firm* — DORITY & MANNING P.A.

(57) ABSTRACT

The present disclosure provides computer-implemented methods, systems, and devices for generating media content pages for live events at scale. A computing system accesses media data associated with a live event. The computing system customizes media data for one or more user groups. The computing system selects one or more page templates from a plurality of page templates based, at least in part on the customized media data. The computing system generates one or more content pages based on the customized media data and the one or more page templates. The computing system provides the one or more content pages to one or more user computing devices.

20 Claims, 9 Drawing Sheets

SYSTEMS AND METHODS FOR GENERATING STORIES FOR LIVE EVENTS USING A SCALABLE PIPELINE

The present disclosure generally relates to computer systems. More particularly, the present disclosure relates to the automated generation of immersive interfaces for distributed computing devices via computer networks and internet services.

BACKGROUND

More than 2.5 quintillion bytes of data are created worldwide each day. Technology providers store billions of gigabytes of content accessible to users via internet search engines and other tools. In addition, users perform over five billion searches worldwide each day to query and access various forms of content. Most of this information exists as long-form text with little or no accompanying visual or audio content.

Content curation generally refers to gathering information relevant to a particular topic and selecting, organizing, and presenting such information in an interesting and meaningful way. Content curation is a time-consuming process requiring specific skills and specialized software. Also, existing methods of content curation are expensive, generally consider only a small fraction of available content, and quickly become outdated in view of increasing amounts of new information generated each day. Further, most content is unavailable in different formats, languages, and interfaces that would otherwise benefit various users around the world.

SUMMARY

Aspects and advantages of embodiments of the present disclosure will be set forth in part in the following description, or can be learned from the description, or can be learned through practice of the embodiments.

An example aspect is directed towards a computer-implemented method. The method comprises accessing, by one or more computing systems including one or more processors, media data associated with a live event. The method further comprises customizing, by the one or more computing systems, the media data for one or more user groups. The method further comprises selecting, by the computing system, one or more page templates from a plurality of page templates based, at least in part on the customized media data. The method further comprises generating, by the computing system, one or more content pages based on the customized media data and the one or more page templates. The method further comprises providing, by the computing system, the one or more content pages to one or more user computing devices.

Another example aspect of the present disclosure is directed to a computing system. The computing system comprises one or more processors; and a computer-readable memory. The computer-readable memory stores instructions that, when executed by the one or more processors cause the device to perform operations comprising accessing media data associated with a live event. The operations further comprise customizing media data for one or more user groups. The operations further comprise selecting one or more page templates from a plurality of page templates based, at least in part on the customized media data. The operations further comprise generating one or more content pages based on the customized media data and the one or more page templates. The operations further comprise providing the one or more content pages to one or more user computing devices.

Another example aspect of the present disclosure is directed towards a computer-readable medium storing instructions. The instructions, when executed by one or more computing systems, cause the one or more computing systems to cause the device to perform operations comprising accessing media data associated with a live event. The operations further comprise customizing media data for one or more user groups. The operations further comprise selecting one or more page templates from a plurality of page templates based, at least in part on the customized media data. The operations further comprise generating one or more content pages based on the customized media data and the one or more page templates. The operations further comprise providing the one or more content pages to one or more user computing devices.

Other aspects of the present disclosure are directed to various systems, apparatuses, non-transitory computer-readable media, user interfaces, and electric devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
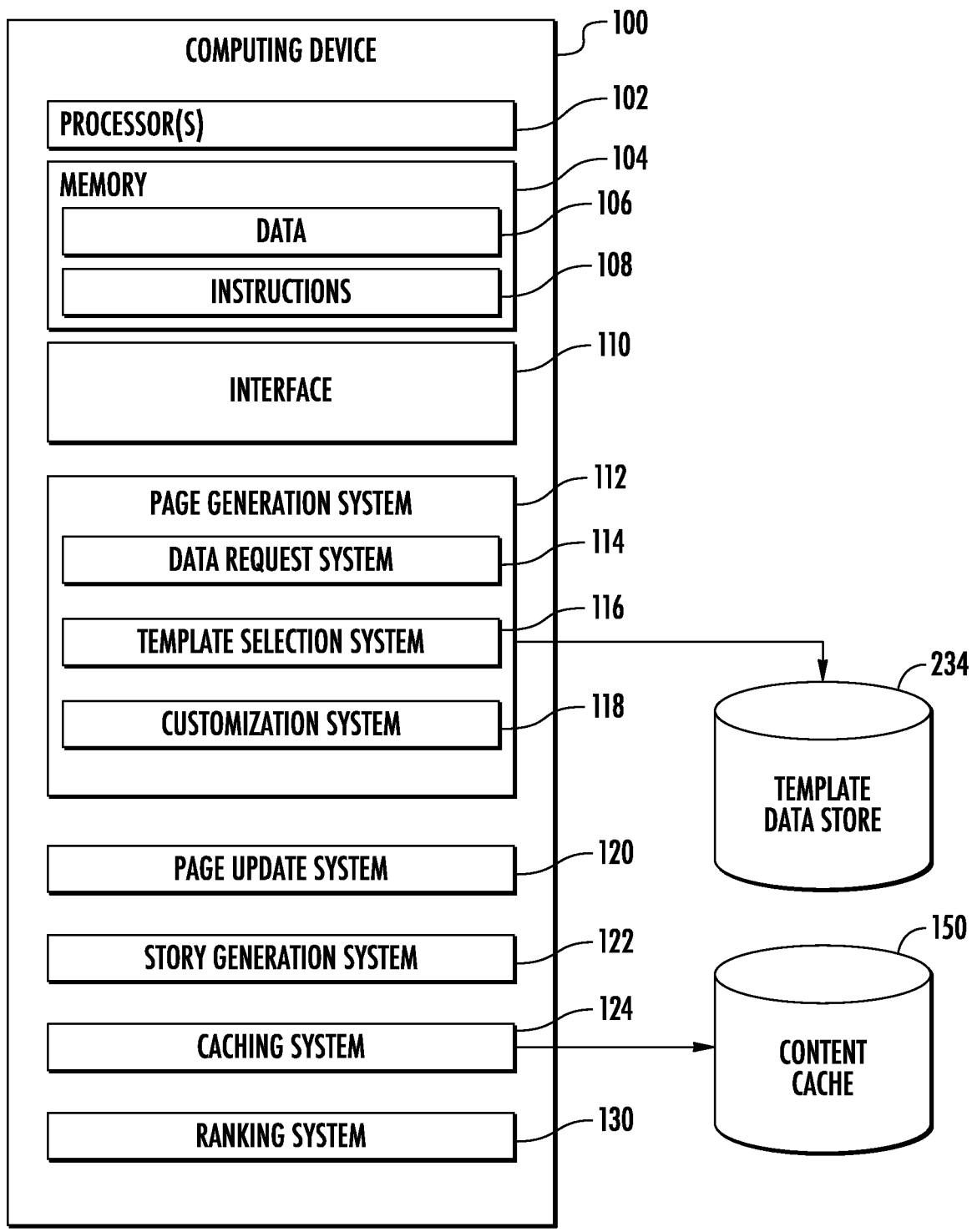
FIG. 1 depicts an example computing system 100 according to example embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to a scalable pipeline for automatically generating content associated with live events. In particular, the technology described in the present disclosure enables the automated generation of multimedia stories for live events in real-time in a scalable manner for a large number of users. To do so, a content generation system can automatically request media data (e.g., one or more media assets) associated with a particular live event (e.g., a sporting event, a political election, and so on). The content generation system can receive media data and, based at least in part on the received media data, select one or more page templates from a plurality of possible page templates. The content generation system can automatically customize the media data for one or more user groups (e.g., users grouped by country of residence, user interest data, user language, and so on). The content generation system can generate one or more content pages associated with the live event using the selected one or more page templates and the customized media data. The content generation system can provide access to the one or more content pages to one or more user devices via a computer network.

For example, a content generation system can provide content for a live sporting event to users. To do so at a large scale, the content generation system can periodically request data associated with the live event from the media data provided. The media data provider can provide media data (e.g., one or more media assets or pieces of media content) associated with the live event including, but not limited to, images, text, video, and audio. In response to the request, the content generation system can receive media data from the media provider. Based on the type of media data and the amount of media data received, the content generation system can select one or more page templates. For example, the media data can include one or more images of highlights within the live sporting event and text describing the images. The content generation system can customize the media data by translating the text into a plurality of languages. The content generation system can generate a plurality of content pages using the customized media data and the selected page templates. The generated pages can be stored on a web server for transmission to user devices as requested.

More specifically, a content generation system can be executed by a server computing system that provides information about live events as a service to user computing devices. Given the large number of users who may wish to access data about particular live events at any particular time, the content generation system can generate content (e.g., pages of content) providing information about one or more aspects of a live event at scale and in real-time (or pseudo-real-time).

The content generation system can, in response to a determination that content is needed for a particular live event, access media data associated with the live event. In some examples, the media event associated with a live event can include images, text, video, and any other media type.

In some examples, the content generation system can periodically generate a query to a third-party service when a live event is occurring. For instance, if the Olympics is ongoing, the content generation system can generate a query every five minutes to a media server that provides media data about the Olympics. Such queries can be generated automatically when a live event is ongoing. The queries can include the specific live event for which the content generation system is generating content and can specify the amount and type of media assets the content generation system is requesting.

In some examples, the content generation system can generate queries in response to determining that a newsworthy live event is currently occurring. For example, the content generation system can monitor public social media feeds, public news sources, and other data. Based on the monitored data, the content generation system can determine that a newsworthy live event is currently occurring. Based on this determination, the configuration system can initiate a query to the media server based on the live event.

The content generation system can receive media data from a remote, third-party media content server. Based on the received media data, the content generation system can select one or more templates for generating content pages. For example, the content generation system can store a plurality of templates for generating content pages. Each template can describe the layout of one or more subsections, each subsection can describe the type of media asset to be displayed, its size, and its specific location. In addition, the template can describe which assets are in the foreground and which in the background. Some portions of the template can be partially or totally transparent.

Each template can be associated with a particular type of content, a particular live event, or a particular category of users. Thus, the template can be selected based on the media data that is available, the type of live event, the intended user group, or several other factors. For example, a first page template can be selected if the received media data includes two images and a caption for the images. A second page template can be used if the media data includes a video and no text. Similarly, a particular template can be associated with presenting scores associated with a baseball game (e.g., listing scoring by inning), and another template can be used with presenting scores associated with a race in the Olympics (listing race times associated with multiple runners).

In some examples, the media content can be customized for one or more user groups. One specific example of this customization can be translating written content into multiple different languages. In this way, content can be generated for different language groups by automatically translating any text within the media data for that specific language group. Thus, content pages can be automatically produced on a large scale for a large number of different user groups. In some examples, translating text between languages may result in different templates being used for different languages. For example, if the number of lines of text for a caption changes between languages, the content generation system can select a more appropriate template for the different languages.

Once one or more templates have been selected and the media content has been customized, the content generation system can automatically generate one or more content pages. Each content page can include one or more pieces of media content and one or more lines of text (e.g., a caption for the image, video, or audio). In some examples, multiple content pages can be combined into a multi-page content story. In this way, a particular live event can have a plurality of content pages associated with it arranged in a particular order.

In some examples, the page template includes a portion associated with an image that has certain characteristics (height, width, resolution, aspect ratio, and so on). In some examples, the images included in the received media data can have characteristics that do not strictly match those associated with a particular portion of the template. To successfully generate a content page based on the template, the content generation system can crop one or more images to match the size and/or aspect ratio indicated by the target page template.

To do so, the content generation system can select one or more candidate images in the media data. Each candidate image can be cropped based on the characteristics associated with the target content data. For example, this process removes a portion of the image if it is too long or too wide. In other examples, multiple portions of the images can be removed to match a particular aspect ratio.

In some examples, the content generation system can access metadata associated with each image. In some examples, the metadata can identify the specific content in one or more portions of the image. For example, if there is a figure in the image, the metadata can define the location of the figure, the identity of the figure in the image, an activity that figure is participating in, and so on. Similarly, if the image includes text, the metadata can determine where the text is and what the text says. The content generation system can filter the images to remove any images in which the cropping process resulted in an important portion of the image being removed. For example, if a portion of text is removed from the image such that it can no longer be easily read, this image can be removed from the candidate images. Similarly, if an important figure or event in the image is partially obscured by the cropping, that image can be removed from the list of candidate images.

The content generation system can, using a machine learning model, generate an aesthetic score for each remaining candidate image. The candidate image with the highest aesthetic score can be selected for insertion in the portion of the target page template. In some examples, thumbnail images can be generated in this way. A specific page can present a plurality of thumbnails for a plurality of different live events or content pages. A user can select a particular thumbnail to view the associated story, page, or live event.

In some examples, the content generation system can use media content to update an existing content page. In this example, the content generation system can receive media data associated with an existing content page (e.g., an ongoing sporting event). In response to receiving additional content, the content generation system can generate additional content pages for an existing multi-page story or remove content from an existing content page and replace it with more up-to-date content.

In some examples, the content generation system can receive feedback from users indicating that one or more content pages include incorrect information or content that does not match other media in the page. For example, if the image associated with a particular page does not match the caption displayed with the page, a user can report that information to the content generation system. In response, the content generation system can remove one or more content pages from a content server such that it is not available to users in the future.

In some examples, the content generation system can generate a content score for each content page (or multi-page story). In some examples, the content score can be based on the relative importance of the associated live event, the recency of the live event, estimated user interest in the specific content page, and so on. In some examples, the target user group can be used to determine a content score for a specific content page. In this way, a plurality of content pages associated with one or more live events can be ranked such that they can be displayed to a user in order of estimated importance to that user. In some examples, the location associated with a particular user group can affect the ranking of a content page. For example, sports results associated with teams closer to a particular user group may be ranked higher than sports results for teams further away from the particular user group. In this way, the content score for a particular content page can differ based on the intended user group. User groups can be determined based on location, nationality, language, user interest, and so on.

In some examples, once the content generation system has generated a plurality of content pages and/or a plurality of multi-page stories, the content generation system can store the generated content in a cache. This cache can be used to provide content to users who request information about a particular live event. In this way, each time a user requests content about a live event, the content generation system can retrieve the appropriate content page and/or multi-page stories from the cache without having to begin the page generation process again.

The systems, methods, and computer program products described herein provide a number of technical effects and benefits. As one example, the embodiments described in the present disclosure automatically request media data, customize it, and include it in content pages for presentation to users in real-time for a live sporting event more efficiently and with fewer computing resources (e.g., less processing power, less memory usage, less power consumption, etc.), that would otherwise be wasted by using manual investigative, creation, editing, and discovery processes.

With reference now to the Figures, example embodiments of the present disclosure will be discussed in further detail.

FIG. 1 depicts an example computing system 100 according to example embodiments of the present disclosure. In some example embodiments, the computing system 100 can be any suitable device, including, but not limited to, a smartphone, a tablet, a laptop, a desktop computer, a server computing system, or any other computing device that is configured such that it can generate content pages or present content pages to a user. The computing system 100 can include one or more processor(s) 102, memory 104, one or more sensors 110, a page generation system 112, a page update system 120, a story generation system 122, a caching system 124, a ranking system 130, a template data store 234, and a content cache 150.

The one or more processor(s) 102 can be any suitable processing device, such as a microprocessor, microcontroller, integrated circuit, or other suitable processing device. The memory 104 can include any suitable computing system or media, including, but not limited to, non-transitory computer-readable media, RAM, ROM, hard drives, flash drives, or other memory devices. The memory 104 can store information accessible by the one or more processor(s) 102, including instructions 108 that can be executed by the one or more processor(s) 102. The instructions can be any set of instructions that when executed by the one or more processor(s) 102, cause the one or more processor(s) 102 to provide the desired functionality.

In particular, in some devices, memory 104 can store instructions for implementing the page generation system 112, the page update system 120, the story generation system 122, the caching system 124, and the ranking system 130. The computing system 100 can implement the page generation system 112, the page update system 120, the story generation system 122, the caching system 124, and the ranking system 130 to execute aspects of the present disclosure, including accessing media data for live events, selecting page and story templates for the live event, customizing the media data, generating the content pages and/or stories for the live event, and providing the generated content pages to users.

It will be appreciated that the terms "system" or "engine" can refer to specialized hardware, computer logic that executes on a more general processor, or some combination thereof. Thus, a system or engine can be implemented in hardware, application-specific circuits, firmware, and/or software controlling a general-purpose processor. In one embodiment, the systems can be implemented as program code files stored on a storage device, loaded into memory and executed by a processor or can be provided from computer program products, for example computer executable instructions, which are stored in a tangible computer-readable storage medium such as RAM, hard disk, or optical or magnetic media.

Memory 104 can also include data 106, such as data associated with the page generation system 112 (e.g., data describing when to request media data, what media data to request, and how to generate content pages from templates), that can be retrieved, manipulated, created, or stored by the one or more processor(s) 102. In some example embodiments, such data can be accessed and used to perform the specific functions associated with the computing system 100.

In some example embodiments, the computing system 100 includes the page generation system 112, the page update system 120, the story generation system 122, the caching system 124, and the ranking system 130. The page generation system 112 can include a data request system 114, a template selection system 116, and a customization system 118. In some examples, the page generation system 112 can also access data provided by the template data store 234 and provide generated pages/stories to the caching system 124.

In some examples, the page generation system 112 can use a data request system 114 to periodically request data from a media data provider. In some examples, the media data provider can be a remote third-party server that provides media data including images, videos, audio, and text associated with live events. For example, when a live sporting event is ongoing, one or more media organizations can capture images, video, audio, and text about the sporting event and make those media assets available for request on a media data server. In some examples, the media assets can be ranked in order of importance. In some examples, the ranking of importance can be received from the third-party media data provider. The data request system 114 can request data by generating a query automatically based on a periodic schedule. For example, if a sporting event is currently occurring, the data request system 114 can transmit a query to a data provider every five minutes. In some examples, the periodic schedule that is used to generate queries automatically can be based on the type of event for which the data is being requested.

In some examples, the data request system 114 can monitor one or more sources of information to determine, automatically, when a newsworthy event is currently ongoing. For example, the data request system 114 can monitor social media feeds to identify currently occurring live events for which content pages should be generated. If, based on the social media data, the data request system 114 determines that a particular live event exceeds a threshold level of importance, the data request system 114 can generate a query to be sent to a media provider (e.g., either a media provided associated with the computing system 100 or a third-party media provider).

In some examples, the query can include information specifying the particular live event of interest, a date, time, event type, and one or more types of media content that are requested. For example, if the Summer Olympics are currently ongoing, the request can include a particular event, date, time, and specify that images of a particular competitor and associated captions are requested. In response, the remote media server can transmit media data to the data request system 114. The remote media server can transmit a number and type of media assets based on the specific amount included in a query. The remote media server can have metadata associated with each media asset and can prioritize sending media assets based on an importance or newsworthiness ranking. In some examples, the audio data can include a plurality of different types of media content including images, audio, video, and text.

In some examples, the template selection system 116 can select one or more page templates (or a story template) from a plurality of page and/or story templates stored in the template data store 234. In some examples, the templates can be selected based on a ranking heuristic. For example, the ranking heuristic can identify page and/or story templates associated with a particular live event. In some examples, the ranking heuristic can rank page templates based on the type and number of media assets available to the page generation system 112. The template data store 234 can include a plurality of page templates. Each page template can include data describing the location, size, and resolution of media to be displayed in a user interface. Thus, a single page, as defined by a page template, can represent one or more media assets arranged in a particular layout that are intended to be displayed together in a user interface of a device (e.g., the display of a smartphone, a display associated with a laptop, etc.). In some examples, a story template can represent a series of pages intended to be grouped or linked together. Using a story template, the page generation system 112 can provide significantly more information to a user than would be available via a single page. In some examples, the pages in a story can be ordered to present a narrative about the live event. For example, the pages can each represent a goal during a match in the order in which they were scored and each page including one or more images of the goals and/or the players who scored the goals. In this way, the story can, through an ordered series of content pages, relate narrative information about a live event.

In some examples, the template selection system 116 can select one or more page templates for a particular event based on a priority of factors. For example, specific sports or events can have predetermined established templates that have been customized to display information associated with that sport live event more effectively. Additionally, specific live events can have customized or specialized templates intended to display information associated with that particular live event (e.g., having a common background associated with the event or customized to show particular data that arises from that particular live event). For example, a live election may have a particular template or series of templates that have been customized to display the election results from a particular location.

In some examples, the template selection system 116 can select a template based on the amount and type of media available. For example, if a large number of media assets (e.g., pieces of media content) are available in the received media data, the template selection system 116 can have a large amount of flexibility in the specific templates it selects. However, if the number of media assets is limited, the templates that the template selection system 116 can select may be limited to only those templates for which the existing media assets are sufficient. In some examples, if only two images are available, the template selection system 116 cannot select any templates that require more than two images. Additionally, if a particular template has a section intended to include video media, that template may only be selected if video media is received from the media server. In some examples, the template selection system 116 can allow for flexibility such that templates that do not exactly match the received media assets can be used. For example, if more images are needed that are available for a particular page template, the page generation system 112 can use generic images associated with the specific live event.

In some examples, the template selection system 116 can select templates such that the amount of variety in a particular story is increased. Thus, if a particular template has been selected for one page in a story already, the template selection system 116 can prioritize selection of other templates when evaluating later pages. In this way, the stories that are generated can be more visually interesting or appealing to a user.

A customization system 118 can customize the media data based on one or more requirements. For example, if the media data includes one or more portions of text, the customization system 118 can translate the text into a plurality of different languages. In some examples, text (e.g., captions associated with images) may require different amounts of space once it has been selected. As a result, the template selection system 116 can, once the text has been translated, select different templates for one or more languages. For example, in some languages, the caption may be able to be represented with only two lines of text while in another language three lines may be needed to present the associated caption. Thus, a first template may be selected for languages that only require two lines while a second template may be selected for languages that require three lines to display the caption. In addition, different languages may require different formatting (e.g., the direction in which the text is read may change).

In some examples, the media assets can be customized by altering one or more images or videos to fit within the space allocated by a particular page template. For example, if the space allocated in a particular template for an image is 100×100 pixels, and a first image is 120×100 pixels, the customization system 118 can crop the first image such that it fits within the allocated area. In some examples, a plurality of images may potentially be able to be cropped to fit within a particular area. In this example, the customization system 118 can evaluate the images to determine the best image to crop for the portion of the template that is allocated to an image.

The customization system 118 can identify a plurality of candidate images (or other media) from within the received media data for a particular live event for a particular portion of the page template. The customization system 118 can then crop each potential image such that it matches the characteristics outlined by the metadata associated with the particular portion in the page template. The customization system 118 can then access metadata for each image. The metadata can include information describing the contents of the image (or other media) including the location and type of objects within the media, the location and identification of people within the media, and the location of any text within the media.

The customization system 118 can then evaluate each cropped image to determine whether the cropping process has removed any important parts of the image. For example, if a portion of the text is removed in the cropping process the image can be removed from the list of candidate images. Similarly, if the important figures are removed or partially obscured the image can be removed from consideration. In some examples, the important parts of the image can be referred to as the salient portions of the image. Only images that retain all the salient portions will be evaluated for potential inclusion in the generated page. Once the images have been filtered to remove any image without all its salient portions, the customization system 118 can use a machine-learned model, to generate an aesthetic score for the remaining candidate images. The machine-learned model can be trained such that it gives high aesthetic scores for images that are likely to be of interest to users. For example, images that are in focus and frame interesting action, important people, important information, and so on can receive higher aesthetic scores. The cropped image that has the highest aesthetic score can be selected and used in a page generated based on a selected page template.

In some examples, the customization system 118 can generate one or more thumbnail images using that cropping process described above. A thumbnail image can be used to represent a particular story or event in very low resolution or detail. These images must be cropped and or resized to fit into a page that may have multiple different thumbnails for multiple different live events. In some examples, rather than cropping the image, the customization system 118 can scale the image up or down so that it fits into the space allocated for it. For example, an image that is 200×200 pixels can be scaled down to fit into an area for a 100×100 pixel image because the aspect ratio remains the same. In some examples, the metadata for a particular page template specifies a resolution needed for a particular portion of the template. The customization system 118 can reduce or improve the resolution for a particular image such that it matches the criteria established by the page template.

In some examples, images can be cropped based on the theme of a particular content page. For example, if a particular page is about a particular player in a match, one or more images can be cropped to highlight the player. Similarly, if the content page is associated with a particular incident (e.g., happening, episode, or occurrence) during the event (e.g., a goal is scored or a penalty given), cropped images can be evaluated based on the degree to which they represent the specific incident.

In some examples, when cropping an image to act as a thumbnail (e.g., an image the represents a multi-page story or group of stories), the image can be cropped to focus on popular topics. For example, if a particular athlete is trending on social media, the images can be cropped to include the particular athlete. The particular athlete can differ for different locations (e.g., countries) or interest groups. By including popular persons, events, or items in the thumbnail, the page generation system can increase the likelihood that users will access and/or view the associated multi-page stories.

Once the appropriate media data has been received, one or more page templates have been selected, and one or more pieces of media content have been customized, the page generation system 112 can generate a page based on the selected template. For example, the page generation system 112 can identify appropriate pieces of media content for each portion of the page defined in the media template. A page can then be generated that has the selected pieces of media content in the appropriate portion. As above, the template data store 234 can also include story templates that are made up of multiple pages. In these examples, the page generation system 112 can generate a plurality of content pages, each content page associated with a particular content page in a story template. The one or more content pages can be linked together in a particular order to create a story.

In some examples, the generated pages can be stored in a content cache 150 for distribution to a plurality of users. In some examples, the stored pages can be updated by the page update system 120. For example, if the data request system 114 receives information associated with a live event with an existing page or story, rather than generate a new story or page, the page update system 120 can change or update the relevant information in the existing page. For example, if the score of a particular sporting event changes, the page update system 120 can use that information to update the appropriate field in an already generated page and/or story.

The story generation system 122 can use the output of the page generation system 112 and combine several generated pages into a single story. In some examples, this combination is based on information stored in a template associated with the story accessed from the template data store 234. In some examples, a particular live event can initially be represented by a single page of content. However, as additional information comes in, additional pages can be added to create a multipage story. In general, a story can include several pages that are linked or otherwise connected in a particular order. In some examples, the user interface display includes interface elements that allow a user to easily switch between the pages. For example, if the story is being displayed on a smartphone, each page may take up the entire screen. Swiping left or right on the currently displayed page may change to the previous or next page in the story. In some examples, the display application can automatically transition to the next page in the story after a predetermined amount of time.

In some examples, the caching system 124 can store generated pages and stories and the content cache 150 and retrieve generated pages and stories from the content cache 150 as needed. For if a user requests information about a particular live event, the computer system 100 can use the caching system 124 to access already generated pages in the content cache 150. In this way, content pages only need to be generated once and retrieved by the caching system for transmission to a plurality of users who are interested in the particular live event.

In some examples, the computing system 100 uses the ranking system 130 to organize the generated pages in order of potential interest to a user. In this way, an application at a user device can present a series of pages and/or stories to the user in the order that will be of most interest to the user. For example, the content pages and/or stories can be ranked according to location. Thus, live events occurring near to a user can be ranked more highly than live events that occur far from the user. In some examples, user interest can be represented in the user profile. The user profile can then be used to rank pages based on which live events would be most interesting to the user. In some examples, users are grouped into groups based on nationality, language, specific teams or organizations that the users are interested in (e.g., club or fans), and so on. The ranking system 130 can generate rankings that are customized for a particular group. In some Examples, the ranking given to particular live events and their associated pages can be attenuated over time such that an event becomes less important the further away it is in time.

Figure 2:
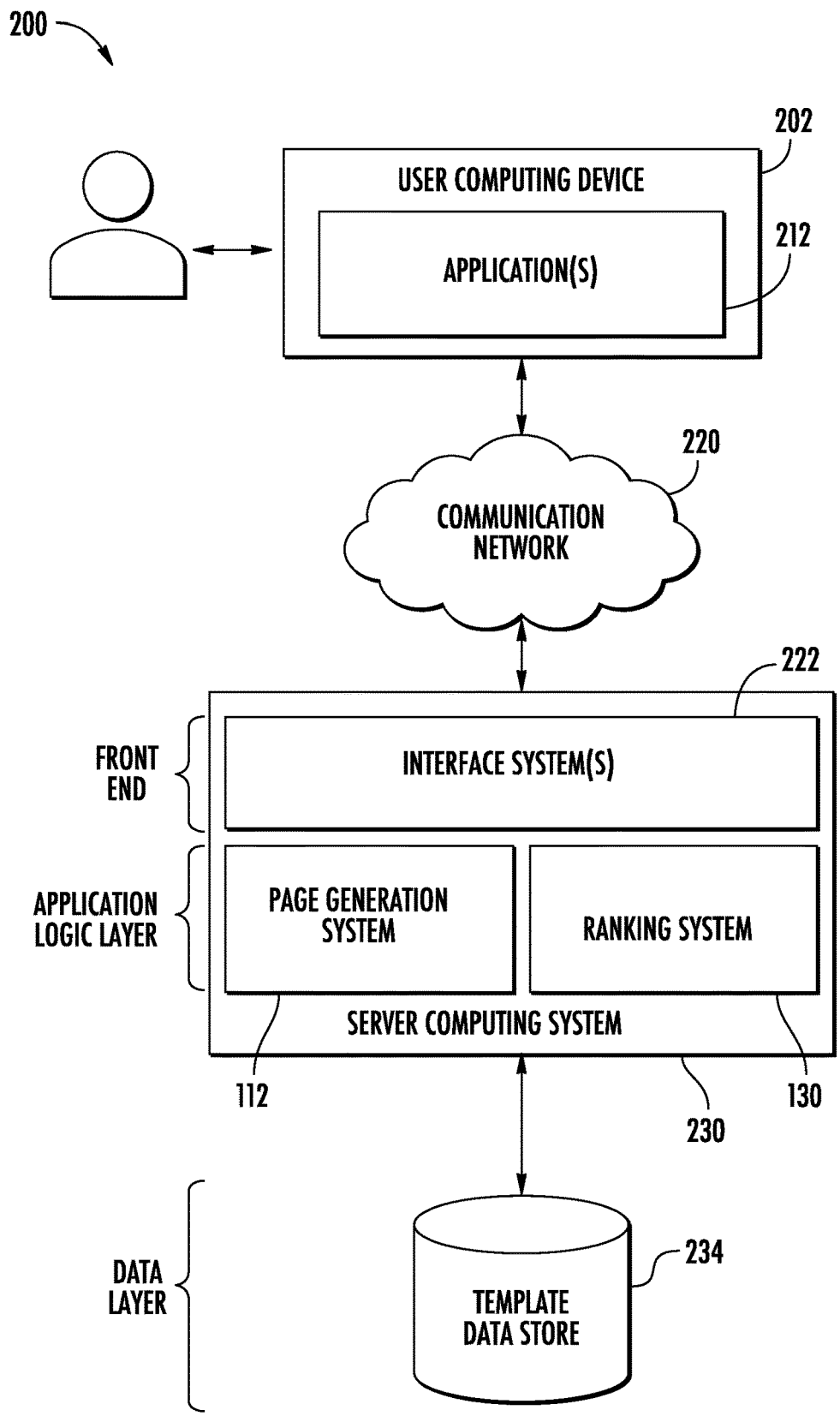
FIG. 2 illustrates an example client-server computing environment in accordance with example embodiments of the present disclosure.

FIG. 2 depicts an example client-server environment 200 according to example embodiments of the present disclosure. The client-server system environment 200 includes one or more user computing devices 202 and a server computing system 230. One or more communication networks 220 can interconnect these components. The communication networks 220 may be any of a variety of network types, including local area networks (LANs), wide area networks (WANs), wireless networks, wired networks, the Internet, personal area networks (PANs), or a combination of such networks.

A user computing device 202 can include, but is not limited to, smartphones, smartwatches, fitness bands, navigation computing devices, laptops computers, and embedded computing devices (computing devices integrated into other objects such as clothing, vehicles, or other objects). In some examples, a user computing device 202 can include one or more sensors intended to gather information with the permission of the user associated with the user computing device 202.

In some examples, the user computing device 202 can connect to another computing device, such as a personal computer (PC), a laptop, a smartphone, a tablet, a mobile phone, a wearable computing device, or any other electric device capable of communication with the communication network 220. A user computing device 202 can include one or more application(s) 212 such as search applications, communication applications, navigation applications, productivity applications, game applications, word processing applications, or any other applications. The application(s) 212 can include a web browser. The user computing device 202 can use a web browser (or other application) to send and receive requests to and from the server computing system 230. The application(s) can include a web browser or other media application that can present media content in the form of generated pages or stories.

In some examples, the user computing device 202 can include one or more sensors that can be used to determine information, with the express permission of the user, associated with the environment of the user computing device 202 or information associated with the user of the user computing device 202 (such as the position or movement of the user). In some examples, the sensors can include a motion sensor to detect the movement of the device or the associated user, a location sensor (e.g., a GPS) to determine the current location of the user computing device 202, and an audio sensor to receive control commands from the user and so on.

As shown in FIG. 2, the server computing system 230 can generally be based on a three-tiered architecture, consisting of a front-end layer, application logic layer, and data layer. As is understood by skilled artisans in the relevant computer and Internet-related arts, each component shown in FIG. 2 can represent a set of executable software instructions and the corresponding hardware (e.g., memory and processor) for executing the instructions. To avoid unnecessary detail, various components and engines that are not germane to conveying an understanding of the various examples have been omitted from FIG. 2. However, a skilled artisan will readily recognize that various additional components, systems, and applications may be used with a server computing system 230, such as that illustrated in FIG. 2, to facilitate additional functionality that is not specifically described herein. Furthermore, the various components depicted in FIG. 2 may reside on a single server computer or may be distributed across several server computers in various arrangements. Moreover, although the server computing system 230 is depicted in FIG. 2 as having a three-tiered architecture, the various example embodiments are by no means limited to this architecture.

As shown in FIG. 2, the front end can consist of an interface system(s) 222, which receives communications from one or more user computing devices 202 and communicates appropriate responses to the user computing devices 202. For example, the interface system(s) 222 may receive requests in the form of Hypertext Transfer Protocol (HTTP) requests, or other web-based, application programming interface (API) requests. The user computing devices 202 may be executing conventional web browser applications or applications that have been developed for a specific platform to include any of a wide variety of computing devices and operating systems.

As shown in FIG. 2, the data layer can include a template data store 234. The template data store 234 can include a plurality of page templates. Each page template can include data describing the location, size, and resolution of media to be displayed in a user interface. Thus, a single page can represent a group of media data intended to be displayed together in a user interface of a device (e.g., the display of a smartphone, the display associated with a laptop, the display of a tablet computer, and so on). In some examples, a story template can represent a series of pages intended to be grouped or linked together. Using a story template, the page generation system 112 can provide significantly more information to a user than would be available via a single page.

The application logic layer can include application data that can provide a broad range of other applications and services that allow users to access or receive geographic data for navigation or other purposes. The application logic layer can include a page generation system 112 and a ranking system 130.

In some examples, the page generation system 112 can periodically and automatically request media data for a particular live event. Live events can include sporting events, weather events, political events, and so on. The server system 230 can provide information about live events at the user computing device 202 via an application 212. The application can receive information via the network in a format that can be displayed on a device associated with the user computing device 202. For example, the server computing system 230 can provide a description in a format that the application 212 can interpret (e.g., HTML for a web browser) to generate a display in a user interface for the user.

In some examples, the page generation system 112 can access media data from a media database associated with the server computing system 230. Additionally, or alternatively, the media data can be accessed from a remote third-party server. The media data can include images, videos, audio, and text associated with live events. If an international sporting event (such as the Olympics) is occurring, users can request information about a particular competition. For example, if a user is interested in badminton, the user may use an application on their user computing device 202 to request up-to-date information about a currently occurring badminton match. The page generation system 112 can obtain information about the match either in response to a request by a user or in advance based on data about significant live events and when those are occurring. The story can be presented to users based on previous interest in badminton.

In some examples, the page generation system 112 can submit a query for media data associated with a particular live event. In some examples, the query can include information specifying the particular live event of interest, a date, time, event type, and one or more types of media content that are requested. For example, if the Summer Olympics are currently occurring, the request can specify a particular event. In some examples, the query can describe a particular event, date, time, and specify a type and number of media assets that are requested. In response, the remote media server can transmit media data to the page generation system 112. In some examples, the media data can include a plurality of different types of media content including images, audio, video, and text.

In some examples, the page generation system 112 can select one or more page templates (or a story template) from a plurality of page and/or story templates stored in the template data store 234. The template data store 234 can include a plurality of page and/or story templates. Each page template can include data describing the location, size, and resolution of media to be displayed in a user interface. Thus, a single page can represent a group of media data intended to be displayed together in a user interface of a device (e.g., the display of a smartphone, a display associated with a laptop, etc.). In some examples, a story template can represent a series of pages intended to be grouped or linked together. Using a story template, the page generation system 112 can provide significantly more information to a user than would be available via a single page.

In some examples, the page generation system 112 can select one or more page templates for a particular event based on a priority of factors. For example, specific sports or events can have predetermined established templates that have been customized to display information associated with that sport live event more effectively. Additionally, particular live events can have customized or specialized templates intended to display information associated with that event. A live event can be associated with a multi-page story template that has a common background associated with the event or pages customized to show particular data that arises from that event. For example, a live election may have a particular template or series of templates that have been customized to display the election results from a particular location. In some examples, no specific page template is associated with a particular live event. Instead, the page generation system 112 can use a heuristic that takes into account multiple factors such as the type of live event, the location, the date and time, the number of media assets available, to rank the possible page templates. In some examples, the page generation system 112 can also rank page templates to increase the diversity of templates used in a particular multi-page story (e.g., page templates that have been used yet may be ranked higher). The page generation system 112 can select the page template with the highest ranking. In some examples, the page generation system 112 can used different rankings for different users or user groups. In this way, one or more user characteristics can be used to select the templates. In some examples, user characteristics such as age, location, nationality, language, interests, and so on can be used to rank templates for that user. In some examples, users can also be grouped based on the type of device they are used to view the pages. Templates can be selected for particular devices or device types.

In some examples, the page generation system 112 can select a page template based on the amount and type of media available. For example, if a large number of content assets are available in the received media data, the page generation system 112 can have a large amount of flexibility in the specific page or story templates it selects. If the number of content assets is limited, the templates that the page generation system 112 can select may be similarly limited. For example, if only two images are available, the template selection system 216 may not select a page template that requires more than two images.

The page generation system 112 can customize the media data based on one or more requirements. For example, if the media data includes one or more portions of text, the page generation system 112 can translate the text into a plurality of different languages. In some examples, the translated text can require different amounts of space. As a result, the page generation system 112 can, once the text has been translated, select different templates for one or more languages. For example, in some languages, the caption may fit in two lines, while in other languages three lines may be needed. A first template may be selected for languages that only require two lines while a second template may be selected for languages that require three lines to display the caption.

In some examples, the pieces of media content can be customized by altering the images or videos to fit within the space allocated by a particular page template. For example, if the space allocated for a particular image in a template is 100×100 pixels, and the selected image is 120×100 pixels, the page generation system 112 can crop the selected image such that it fits within the area. In some examples, a plurality of images may potentially be able to be cropped to fit within a particular area. In this example, the page generation system 112 can evaluate the images to determine the best image to crop for the portion of the template that is allocated to an image.

Once the appropriate media data has been received, a template is selected, and one or more pieces of media content have been customized, the page generation system 112 can generate a page based on the selected template. For example, the page direction system can identify appropriate pieces of media content for each portion of the page defined in the media template. A content page can then be generated that has the selected pieces of media content in the appropriate portion. As above, the template data store 234 can also include story templates that are made up of multiple content pages. In these examples, the page generation system 112 can generate a plurality of content pages, each associated with a particular page in a story template. The plurality of content pages can be linked together in a particular order to create a story.

In some examples, the server computing system 230 can include a ranking system 130 that organizes the generated pages in order of potential interest to a user. In this way, an application 212 at the user computing device 202 can receive a series of pages and/or stories and present them to the user in the order that will be of most interest to the user. For example, the content pages and/or stories can be ranked according to location. Thus, live events occurring near to a user can be rated more highly than live events that occur far from the user. In some examples, user interest can be represented in the user profile. The user profile can then be used to rank pages based on which live events would be most interesting to the user. In some examples, users are grouped into groups based on nationality, language, specific teams, or organizations that the users are interested in, and so on. The ranking system 130 can generate rankings that are customized for a particular group. In some examples, the ranking given to particular live events and their associated pages can be attenuated over time such that an event becomes less important the further away it is in time.

Figure 3:
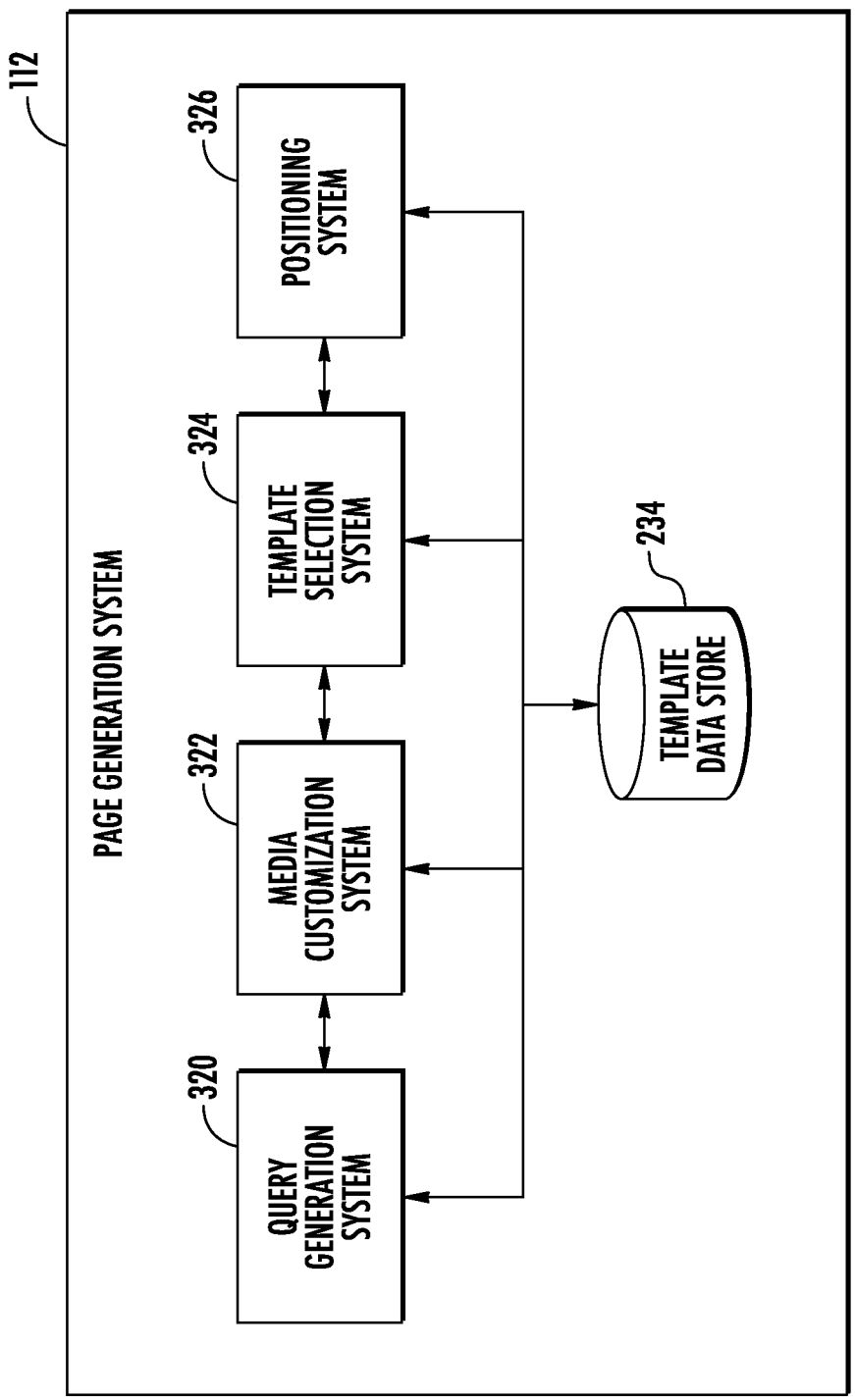
FIG. 3 illustrates an example page generation system in accordance with example embodiments of the present disclosure.

FIG. 3 illustrates an example page generation system 112 in accordance with example embodiments of the present disclosure. The page generation system 112 can include a query generation system 320, a media customization system 322, template selection system 324, and a positioning system 326.

In some examples, a query generation system 320 can generate a query to request media data from a source of media data. In some examples, the media data can include any type of media content such as images, audio, video content, text, or any other type of media content. The query generation system 320 can generate the query in response to a periodic schedule. The periodic schedule can be predetermined or can be generated in response to determining that an event is ongoing. Thus, the query generation system 320 can access a database that includes information about when to generate queries. A query can include data that allows the media server to know what type of media to return to the query generation system 320. For example, the query can include information describing a specific live event, the type of media assets, requested, a time, one or more specific entities (e.g., people, teams, countries, and so on), a size of a media file, and/or resolution or other quality of the media.

The media customization system 322 can customize one or more pieces of media content that were received in response to the media data query. Customizing the one or more pieces of media data can include, but is not limited to: translating text from one language to another, cropping an image, editing a video, adjusting the resolution of an image or video up or down, changing the volume of an audio clip, and so on. In some examples, the media customization system 322 can customize the pieces of media content based on the requirements associated with a particular page template.

In some examples, a template selection system 324 can select a page template from a plurality of possible templates stored in the template data store 234. The plurality of templates can be associated with different live events, different types of events, specific live events, particular locations, seasons, sports, and events. In some examples, the template selection system 324 can select a multi-page story template. Each page template can define the specific manner in which media, text, and other components of a user interface are to be displayed on the screen of a user device. In some examples, the page template can have associated metadata that defines a plurality of portions of the page and describes the type of media content that should be included in that portion. In some examples, metadata associated with the page can also describe the size of media to be included in a particular portion, a resolution, aspect ratio, and so on.

A positioning system 326 can generate a content page (or a plurality of content pages) by arranging one or more selected pieces of media content as dictated by the selected template into a page of content that can be transmitted to a user. In some examples, the generated content page can be defined using a markup language. The page generation system can then transmit the generated one or more pages to a cache where it can be retrieved by the server computing system 230 as requested by one or more user computing systems 202.

Figure 4:
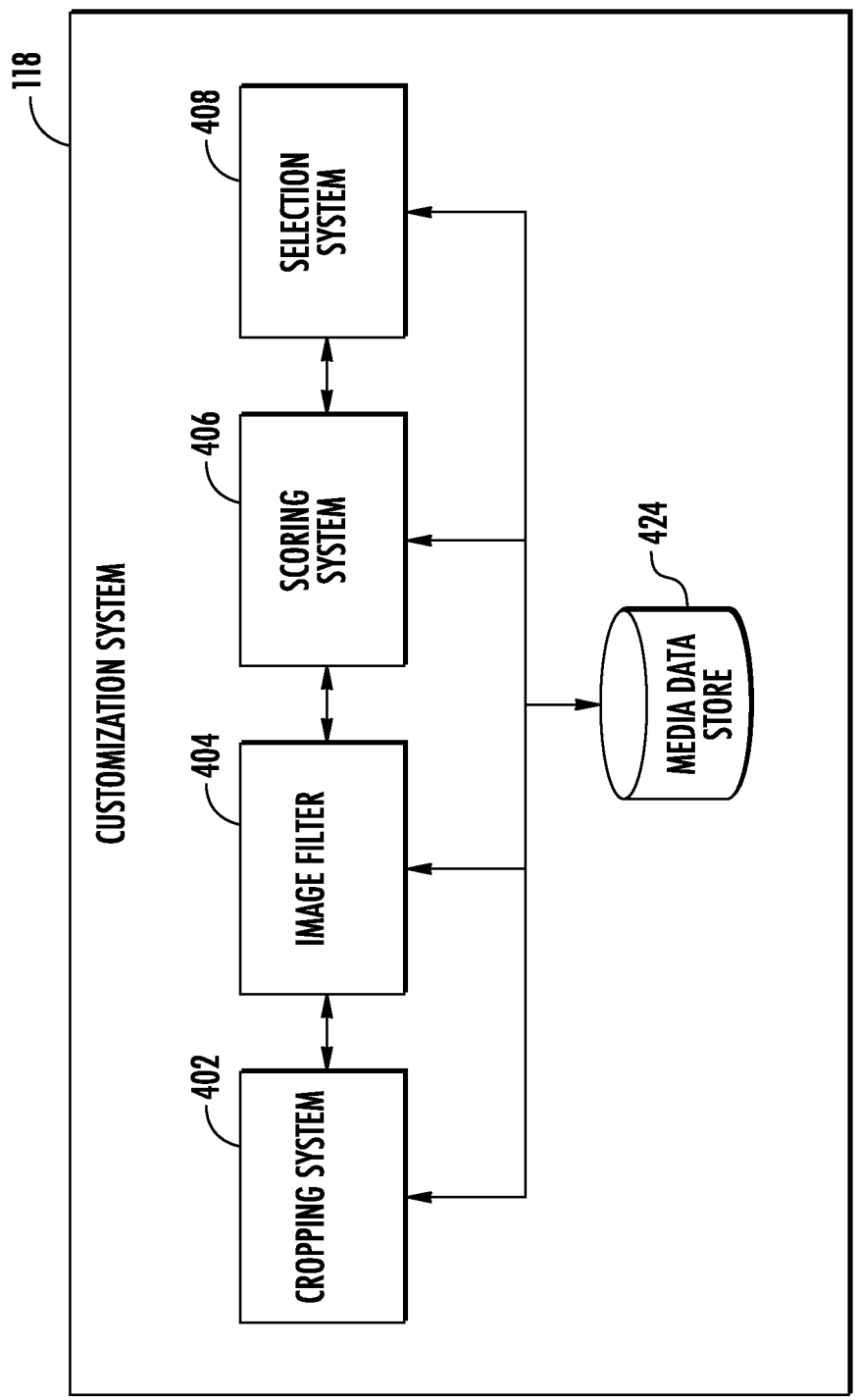
FIG. 4 illustrates an example content server in accordance with example embodiments of the present disclosure.

FIG. 4 illustrates an example page generation system 118 in accordance with example embodiments of the present disclosure. The page generation system 112 can include a cropping system 402, an image filter 404, a scoring system 406, and a selection system 408.

In some examples, the cropping system 402 can access metadata associated with a particular page template. In some examples, the metadata can be accessed from the media data store 424. The media data store 424 can store media assets and associated metadata. In some examples, media assets can be customized (e.g., translated, edited, cropped, and so on) and the customized data can be stored in the media data store 424.

The page template can define the size and location of one or more pieces of media content within a page. Thus, the cropping system 402 can determine the size of a particular piece of media content in the template based on one or more of: the number of pixels, percentage of the total user interface, a specific aspect ratio, or a resolution associated with an image or video.

Once the cropping system 402 has determined a particular size or aspect ratio of media, the server computing system can identify a plurality of candidate pieces of media content. For example, the cropping system 402 can access one or more received images that are associated with a particular live event. In some examples, the cropping system can crop the one or more candidate pieces of media content into a size or aspect ratio that matches the size or aspect ratio of the portion of the page template.

In some examples, an image filter can analyze the one or more cropped images. For example, analyzing more images can involve accessing metadata associated with the contents of each image. The metadata can describe the location and size of one or more features within the image (or another type of media content). In some examples, the metadata can describe the importance of each feature. For example, if an image is associated with a sporting event, one or more people in the image may be the focus of the image and therefore more important than other people within the image. The metadata can also describe the location and content of any text within the image. The image filter 404 can determine, for each cropped image, whether the cropping has resulted in an important aspect of the image being removed or obscured. For example, if part of a portion of text is removed during the cropping process, the filter can remove that cropped image from the list of candidate images.

Once the image filter 404 has filtered out any image that has an important aspect of the image altered or removed during the cropping process, the list of candidate images can be passed to the scoring system 406. In some examples, the scoring system 406 can include a machine-learned model that generates an aesthetic score for each remaining cropped image. The aesthetic score can represent the degree to which the cropped image is aesthetically pleasing based on one or more factors. For example, the factors can include the degree to which the content of the image is relevant to the event a particular live event, whether the image includes important information about the event (e.g., a goal being scored), and whether the key elements of the image are framed in an aesthetically pleasing way (e.g., important figures are presented in a way that they are clear and easy to see).

The selection system 408 can, based on the one on more aesthetics scores, select one or more images to be placed in the generated page. In some examples, the selection system 408 can select an image with the highest aesthetic score. In some examples, the selection system 408 can select one image from a plurality of distinct groups of images. For example, if there are several groups of images, each group representing a key player in a particular live match, the selection system 408 can select the image with the highest aesthetic score from each group. In this way, a page or story can be generated that highlights several different players in the match even if images associated with a single player have the overall highest aesthetic scores.

Figure 5:
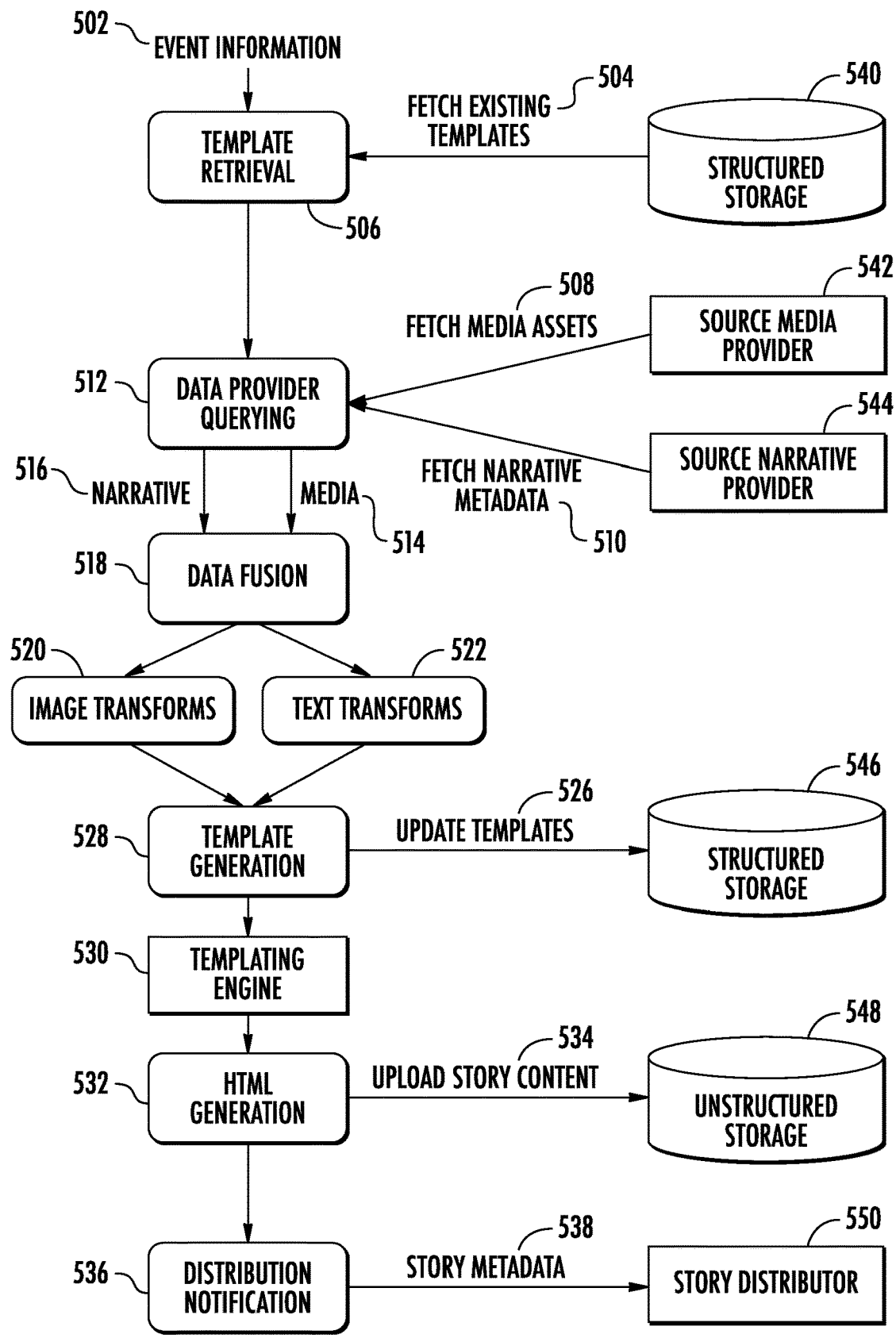
FIG. 5 illustrates an example flow diagram in accordance with example embodiments of the present disclosure.

FIG. 5 illustrates an example flow diagram in accordance with example embodiments of the present disclosure. In this example, the server computing system (e.g., the server computing system 230 in FIG. 2) can receive event information 502. The event information 502 can be any information describing a particular live event that is occurring or will occur in the future. The event information 502 can include information describing the type of event, the time of the event, how often to request data for the event, information about the types of users that may be interested in the event, as well as other information. The template retrieval system 506 can fetch the existing templates 504 from structured storage 540. Structured storage 540 can enable the template retrieval system 506 to quickly identify the appropriate group of templates for the live event.

The server computing system can query the data provider 512. In some examples, the data provider can include a source media provider 542 and the source narrative provider 544. In some examples, the source media provider provides media assets including images, audio, video, and potentially text. The source narrative provider 544 can provide narrative details about a live event. For example, if the live event is soccer match, the narrative details can include information about important events that occurred during the match, including goals, substitutions, penalties, injuries, and so on. The narrative details can be used to determine the specific contents for each page of a multi-page story (e.g., a page for each goal and/or highlight). The server computing system can, by querying the data providers, access media assets 508 and narrative metadata 510.

The media assets 514 and the narrative metadata 516 can be provided and used in data fusion 518 to combine the narrative and media information. In some examples, data fusion 518 includes, identifying, for a series of narrative events describing in the narrative data, appropriate media assets to display on a match for each narrative event. For example, if each page is associated with a goal in a soccer match, the data fusion 518 system can identify images of each player that scored the respective goal, or an image of the goal being score. In addition, the data fusion can also include steps to customize the media assets for inclusion in a particular page. For example, the steps can include transforming images 520 and transforming text 522. Transforming images can include cropping, resizing, and zooming one or more images to ensure that the one or more images will fit into a selected template. In some examples, the text 522 can be transformed. The transforming the text 522 can include translating the text into a plurality of different languages.

In some examples, the server computing system can generate one or more templates 528. Generating templates can include updating templates from existing templates. In other examples, templates can be newly generated based on the transformed image and the transformed text. In some examples, the updated templates 526 can be stored in structured storage 546.

The template engine 530 can take, as input, the updated templates, the image information, and the text information. The template engine 530 can produce one or more HTML pages that include the transformed images and transformed text based on the template that was selected. In some examples, these HTML pages can be grouped by an html generation system 532 into ordered, multi-page stories. The story content can be uploaded 534 to unstructured storage 548 that can be accessed retrieved for transmission to one or more users.

In some examples, a distribution notification 536 can be generated. The story metadata 538 can be transmitted to a story distributor 550. This information can be used to notify users that the story is available. Users can then request story content that can be accessed from, for example, the unstructured storage 548.

Figure 6:
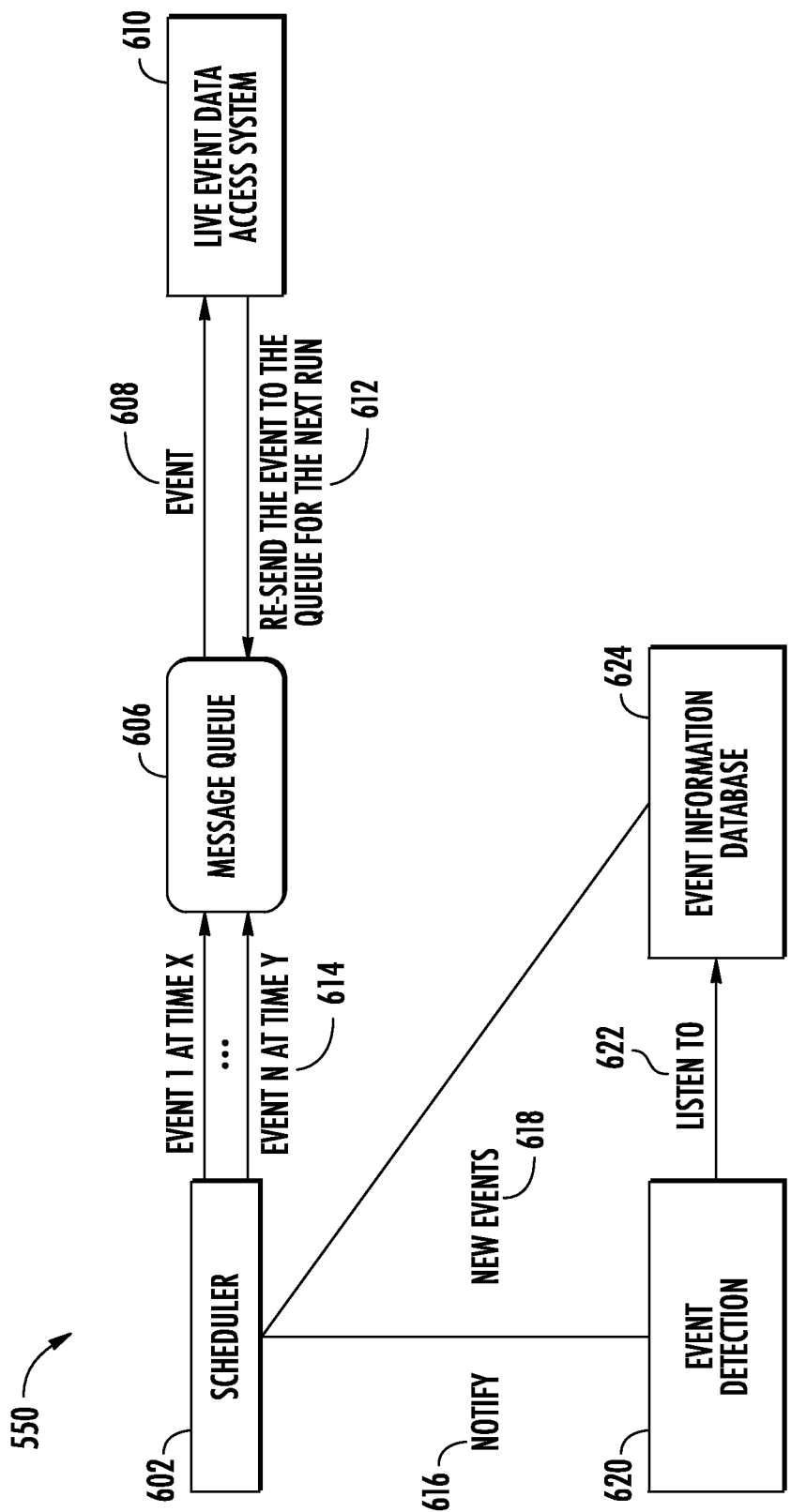
FIG. 6 illustrates an example flow diagram in accordance with example embodiments of the present disclosure.

FIG. 6 illustrates an example flow diagram in accordance with example embodiments of the present disclosure. In some examples, a server computing system (e.g., the server computing system 230 in FIG. 2) for accessing live event media data can include a scheduler 602, a message queue 606, a live event data access system 610, an event detection system 620, and an event information database 624. In some examples, event detection system 620 can determine when a current live event is occurring. To do so, the event detection system 620 can monitor 622 (or access) information being stored in an event information database 624. The event information database 624 can include information gathered from social media sources. A web service can provide information entered by users describing when and where particular live events are occurring. The event information database 624 can be populated by information scraped from publicly available social media posts. In yet other examples, a web server can enable users to submit data for one or more live events describing when the event is occurring in a way that is accessible to the server computing system via a computer network.

When a new event is identified, the event information database 624 can transmit information about new events 618 to the scheduler 602. Similarly, the event detection system 620 can transmit a notification 616 to the scheduler 602 when a new event is identified based on the information in the event information database 624.

The scheduler 602 can transmit information about events to the message queue 606. Information about the events can include the name of the event and the time. In some examples, the scheduler 602 can also request 614 the message queue 606 to store an event 608 or message to be executed at a particular time. In this way, the scheduler 602 can plan when information will be received for an event that has not yet occurred. The message queue 606 can be preloaded with one or more requests to be performed at a particular time or in accordance with a particular schedule. In some examples, the message queue 606 can operate to periodically request events on a fixed repeating schedule (e.g., every five minutes).

The message queue 606 can store a plurality of query events based on information received from the schedule. The query events can be ordered based on when the queries are to be submitted. Thus, when new information is received from the scheduler regarding when to query for a particular live event, the message queue 606 can insert the new query event into the queue at the appropriate position. The message queue 606 can process the stored queue events (e.g., planned queries), executing the queue events based on the order in which they are stored in the queue and/or the scheduling time at which the queue requests are scheduled to be executed.

When the message queue 606 determines that a query event is scheduled, it can transmit the query to the live event data access system 610. In some examples, the live event data access system 610 can, as part of a response to a particular query, resend the query event back to the message queue queries to be run. In this way, queries can be executed during the entire time the live event is occurring. For example, if the live event is a volleyball match, query events can be scheduled to occur periodically from the time the volleyball match is scheduled to begin until a predetermined amount of time after the volleyball match is predicted to end. In some examples, the queries can be continued to be executed until data received from one of the queries indicates that the volleyball match has ended. In some examples, the live event data access system 610 can schedule the next queue event (e.g., a query) based on the amount of media data received from the previous queue event by resending 612 an event back to the message queue 606. Thus, if a significant amount of media data is being returned in response to a query, the next query can be scheduled to occur more frequently. If very little media data is received, the next query can be scheduled to be executed after a longer period.

Figure 7:
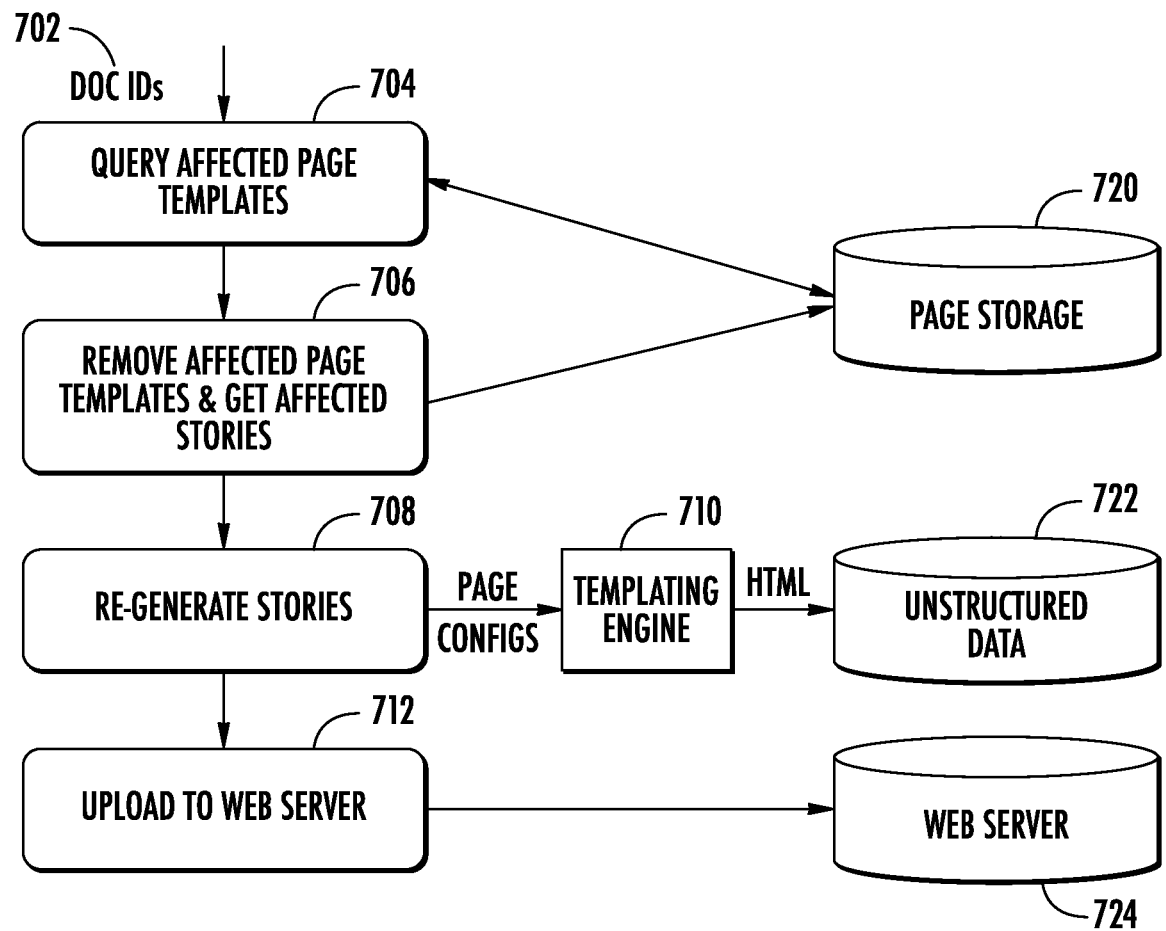
FIG. 7 illustrates an example flow diagram in accordance with example embodiments of the present disclosure.

FIG. 7 illustrates an example flow diagram in accordance with example embodiments of the present disclosure. One or more pages can be determined to be in need of being updated or removed. In some examples, a page can be updated when new information about the live event to which it refers is received. In other examples, a user can note that content within the generated pages is incorrect or out of date.

The server computing system (e.g., the server computing system 230 in FIG. 2) can access the document ID 702 associated with a particular page. The server computing system can query page storage 720 using the document ID 702 to identify one or more pages associated with the request to update or remove the one or more content pages. In some examples, the server computing system can remove the associated page templates from the template database and access the reported story 706. In this way, if the problem is with the template itself, no new pages will be created while the correction is being made.

The server computing system can regenerate 708 one or more pages/stories and use the templating engine 710 to generate new or updated pages and stories. This information can be stored in an unstructured database 722 from which it can be transmitted or accessed by a plurality of users. In addition, information about the generated stories can be uploaded 712 to a web server 724. The web server 724 can transmit data about the one or more stories to applications on user devices (e.g., Google Discover) such that users can be made aware of the content and can access it.

Figure 8:
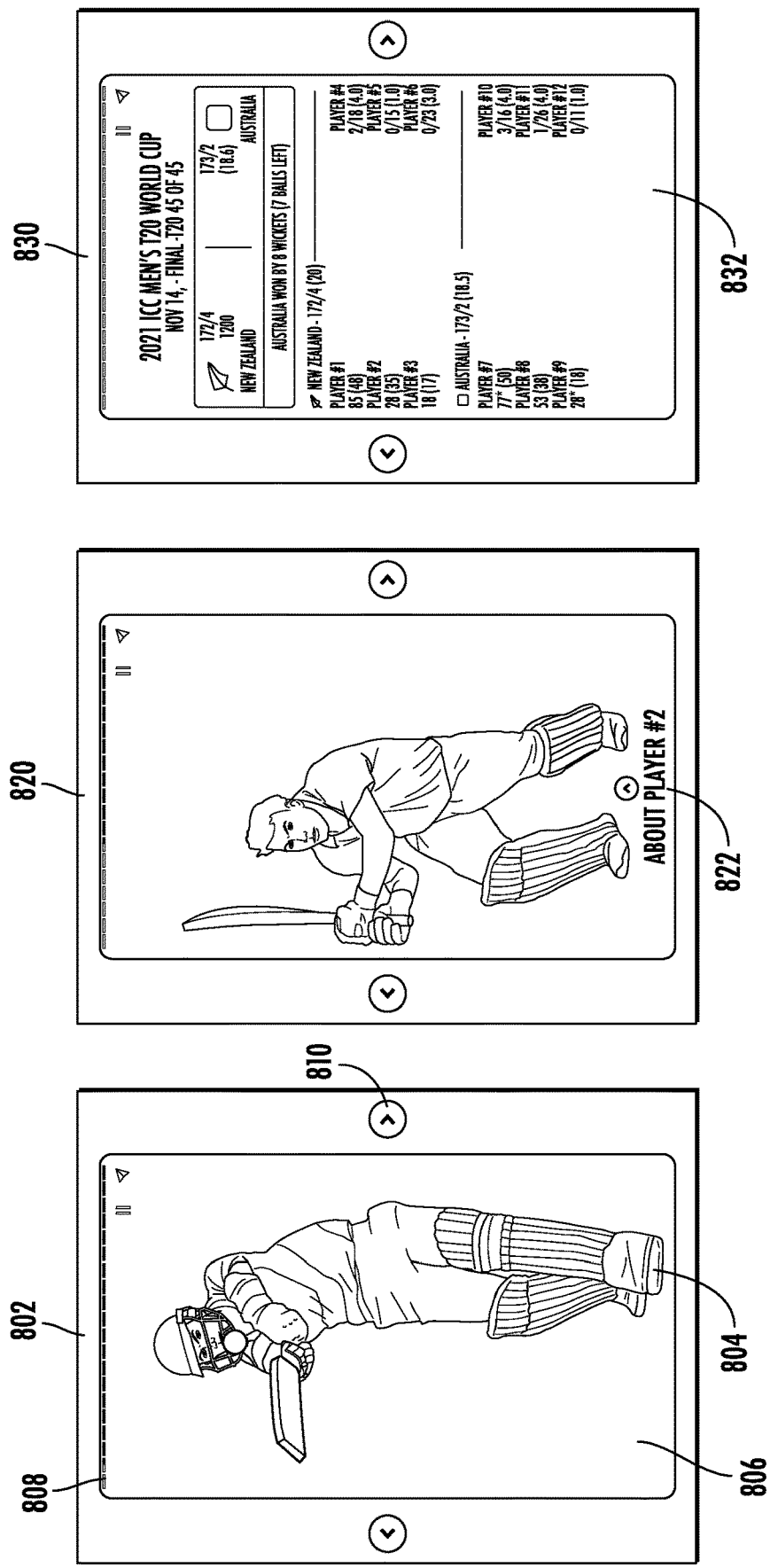
FIG. 8 illustrates an example user interface in accordance with example embodiments of the present disclosure.

FIG. 8 illustrates an example user interface in accordance with example embodiments of the present disclosure. In this example, three different pages of a multi-page story are displayed. Each page has a background 806, one or more pieces of media content, and user interface elements to allow the user to navigate through the story.

For example, the first page 802 includes an image of a cricket player 804 and text describing what is happening during the pictured scene. In addition, it includes an indication 808 of where the page falls in the multi-page story. For example, this first page occurs second from the beginning. The page also includes two arrow icons 810 that allow the user to move to the next or previous page in the story.

The second page 820 includes similar features, a central image, associated caption text, user interface elements for navigating through the story, and so on. In addition, page 2 includes a user interface element 822 that allows the user to request or see additional information about a cricket player displayed in the image associated with the page.

In this example, the third page 830 does not include a large image. Instead, it includes information about the match 832 for which the page or story is being generated. Thus, the page includes a descriptor of the match (e.g., the teams or countries who are competing), the time the match occurred, the participants, and relevant details about the match itself.

Figure 9:
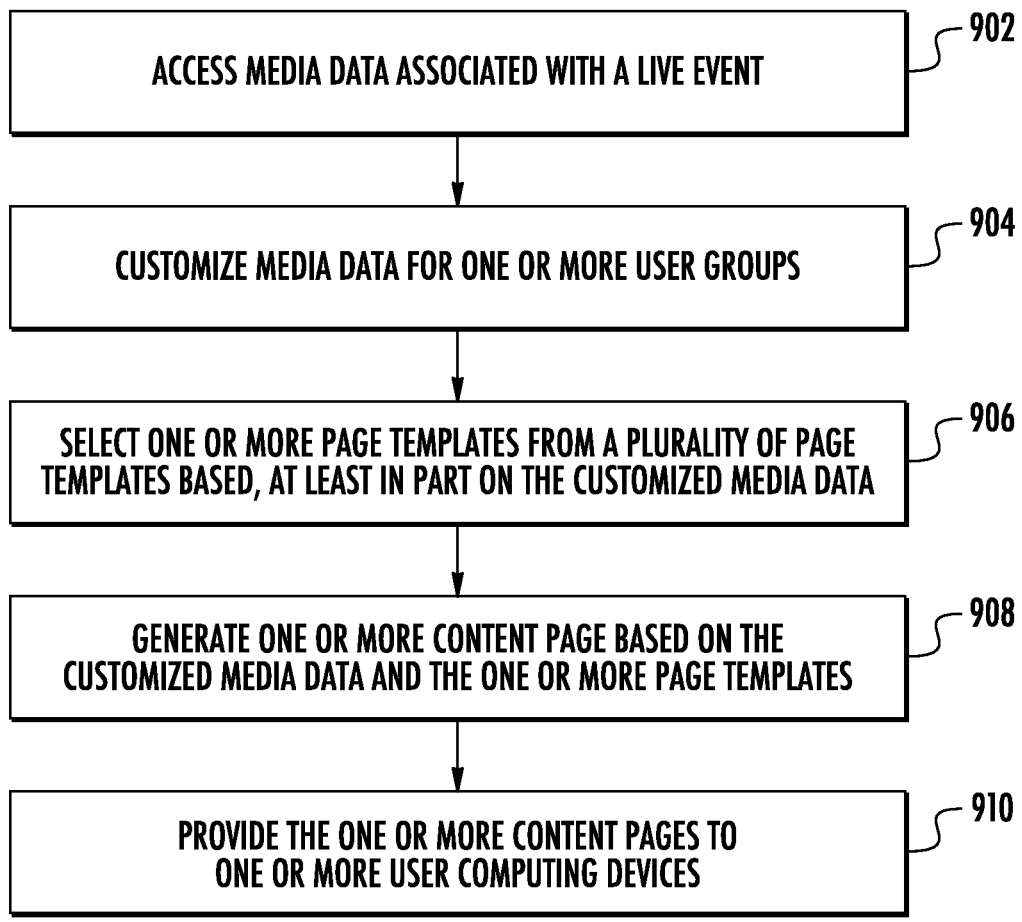
FIG. 9 illustrates an example flow diagram in accordance with example embodiments of the present disclosure.

FIG. 9 depicts an example flow diagram for a method of generating routes based on health-related criteria according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing systems, such as one or more of the computing systems depicted in FIGS. 1-4.

A server computing system (e.g., server computing system 230 in FIG. 2) can include one or more processors, memory, and other components that, together, enable the computing system to automatically generate content pages for live events. The server computing system can, at 902, access media data associated with a live event. In some examples, the server computing system can automatically submit a query to a media provider. In some examples, the server computing system can receive, from the media provider, media data associated with the query. The media provider can include a remote third-party computing server.

In some examples, the query includes parameters describing one or more of: a specific live event, a date, a time, or a location. The media data can include one or more images and one or more text portions. The media data can include one or more videos. In some examples, the query can be automatically generated based on a periodic schedule.

In some examples, the server computing system can, at 904, customize the media data for one or more user groups. In some examples, customizing the media content can include translating one or more text portions of the media data into a plurality of different languages. In some examples, the customizing can include cropping, by the computing system, one or more images based on the information describing a particular page template. Users can be grouped based on the language they use or the region of the world in which they are located. In some examples, language groups can be subdivided based on different dialects. For examples, different spelling and/or vocabulary can be used for different dialectic groups. In addition, different access can be used when generating voice audio (e.g., TTS) for text based on the specific accent or dialect for a particular group. In some examples, users can be grouped into one or more groups based on their interests.

In some examples, the server computing system can, at 906, select one or more page templates from a plurality of page templates based, at least in part, on the customized media data. In some examples, the live event can have an associated event type. For example, a live event may be a sporting event, a political event, a music event, and so on. In some examples, the one or more page templates are selected based, at least in part, on the event type of the live event. Each page template can include one or more subsections, each subsection associated with a particular media type at a particular location within the page.

In some examples, the template can include data describing the look and feel of the content page. For example, the template describe specific colors, fonts, text sizes, animations, transitions, effects applied to the images or text, and so on that can be used to generate a full content. In some examples, the same look and feel characteristics can be used for a multi-page story. The template can also describe whether the pages are in portrait or landscape mode. In some examples, the template can determine the location of text based on characteristics of an image used as background to the text. In some examples, the system can identify salient areas of the image and arrange the text so it does not obscure important areas of the image. Characteristics of the image can also be used to customize the color and size of text. In addition, the image can be cropped to zoom in on a particular person in the image.

In some examples, the server computing system can determine a number and type of pieces of media content included in the media data. The server computing system can select one or more page templates based on the number and type of media content in the media data. In some examples, the page templates include templates for multi-page stories.

In some examples, the server computing system can, at 908, generate one or more content pages based on the customized media data and the one or more page templates. The server computing system can automatically assemble one or more pieces of media content in the media data into the one or more content pages based on the content associated with the respective piece of media content. In some examples, the server computing system aggregates two or more pages into a multi-page story. In some examples, the server computing system can, at 910, provide the one or more content pages to one or more user computing devices.

The technology discussed herein makes reference to sensors, servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:
   receiving, by a computing system including one or more processors, a stream of media content associated with an ongoing live event from a third-party media content provider;
   for each respective user group in a plurality of user groups, wherein each user group includes at least one shared characteristic:

selecting, by the computing system and in real-time, one or more pieces of media content from the stream of media content based at least in part, on a recency of the one or more pieces of media content and one or more shared characteristics of the respective user group;

automatically customizing, by the computing system, the selected pieces of media content for the respective user group, wherein the selected pieces of media data are automatically customized based on one or more characteristics of the respective user group;

selecting, by the computing system, one or more page templates from a plurality of page templates based, at least in part on the customized media data for use in one or more content pages customized for the respective user group; and generating, by the computing system, one or more content pages based on the customized media content and the one or more page templates; and transmitting, by the computing system, a plurality of customized content pages representing information about the ongoing live event to a plurality of users in the plurality of user groups, wherein each user of the plurality of users receives one or more content pages customized for the user's user group.

2. The computer-implemented method of claim 1, wherein receiving, by a computing system including one or more processors, a stream of media data associated with an ongoing live event further comprises:

automatically submitting, by the computing system, a query to third-party media content provider, and receiving, by the computing system from the third-party media provider, a stream of media content associated with the query.

3. The computer-implemented method of claim 2, wherein the pieces of media content are selected such that only pieces of media content generated within a predetermined amount of time from a current time are selected.

4. The computer-implemented method of claim 2, wherein the query includes parameters describing one or more of a specific live event, a date, a time, or a location.

5. The computer-implemented method of claim 2, wherein the stream of media data includes one or more images and one or more text portions.

6. The computer-implemented method of claim 2, wherein the stream of media data includes one or more videos.

7. The computer-implemented method of claim 2, wherein the query is automatically generated based on a periodic schedule.

8. The computer-implemented method of claim 1, wherein automatically customizing, by the computing system, selected pieces of media content for the respective user group further comprises:

translating, by the computing system, one or more text portions of the media data into a language associated with the respective user group.

9. The computer-implemented method of claim 1, wherein automatically customizing, by the computing system, selected pieces of media content for the respective user group further comprises:

cropping, by the computing system, one or more images based on the selected page template.

10. The computer-implemented method of claim 1, wherein the ongoing live event has an associated event type.

11. The computer-implemented method of claim 10, wherein the one or more page templates are selected based, at least in part, on the event type of the ongoing live event.

12. The computer-implemented method of claim 10, wherein each page template includes one or more subsections, each subsection associated with a particular media type at a particular location within the page.

13. The computer-implemented method of claim 12, wherein selecting, by the computing system, one or more page templates from a plurality of page templates based, at least in part on the customized media content further comprises:

determining, by the computing system, a number and type of pieces of media content included in the selected pieces of media content, and selecting, by the computing system, one or more page templates based on the number and type of pieces of media content.

14. The computer-implemented method of claim 12, wherein generating, by the computing system, one or more content page based on the customized media data and the one or more page templates further comprises:

automatically, by the computing system, assembling one or more selected pieces of media content into the one or more content pages based on the one or more page templates.

15. The computer-implemented method of claim 1, further comprising:

aggregating, by the computing system, two or more content pages into a multi-page story.

16. The computer-implemented method of claim 1, wherein the page templates include templates for multi-page stories.

17. The computer-implemented method of claim 1, wherein users are grouped based on language.

18. The computer-implemented method of claim 1, wherein users are grouped based on user interests.

19. A computing system, the computing system comprising:

one or more processors; and a computer-readable memory, wherein the computer-readable memory stores instructions that, when executed by the one or more processors, cause the computing system to perform operations, the operations comprising:

receiving a stream of media content associated with an ongoing live event from a third-party media content provider;

for each respective user group in a plurality of user groups, wherein each user group includes at least one shared characteristic:

selecting, in real-time, one or more pieces of media content from the stream of media content based at least in part, on a recency of the one or more pieces of media content and one or more shared characteristics of the respective user group;

automatically customizing, by the computing system, the selected pieces of media content for the respective user group, wherein the selected pieces of media data are automatically customized based on one or more characteristics of the respective user group;

selecting, by the computing system, one or more page templates from a plurality of page templates based, at least in part on the customized media data for use in one or more content pages customized for the respective user group; and generating, by the computing system, one or more content pages based on the customized media content and the one or more page templates; and transmitting a plurality of customized content pages representing information about the ongoing live event to a plurality of users in a plurality of user groups, wherein each user receives one or more content pages customized for the user's user group.

20. A non-transitory computer-readable medium storing instructions that, when executed by one or more computing systems, cause the one or more computing systems to perform operations, the operations comprising:

receiving a stream of media content associated with an ongoing live event from a third-party media content provider;

for each respective user group in a plurality of user groups, wherein each user group includes at least one shared characteristic:

selecting, in real-time, one or more pieces of media content from the stream of media content based at least in part, on a recency of the one or more pieces of media content and one or more shared characteristics of the respective user group;

automatically customizing, by the computing system, the selected pieces of media content for the respective user group, wherein the selected pieces of media data are automatically customized based on one or more characteristics of the respective user group;

selecting, by the computing system, one or more page templates from a plurality of page templates based, at least in part on the customized media data for use in one or more content pages customized for the respective user group; and generating, by the computing system, one or more content pages based on the customized media content and the one or more page templates; and transmitting a plurality of customized content pages representing information about the ongoing live event to a plurality of users in a plurality of user groups, wherein each user receives one or more content pages customized for the user's user group.

\* \* \* \* \*